Figure 4:
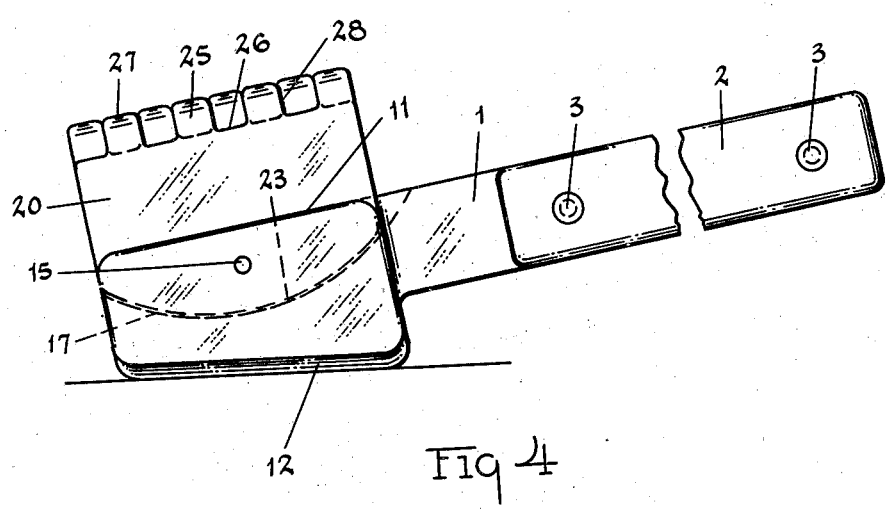

July 27, 1948.  J. C. BURKETT  2,445,872
MALLET FOR PREPARING MEAT
Filed Dec. 3, 1945  2 Sheets-Sheet 1
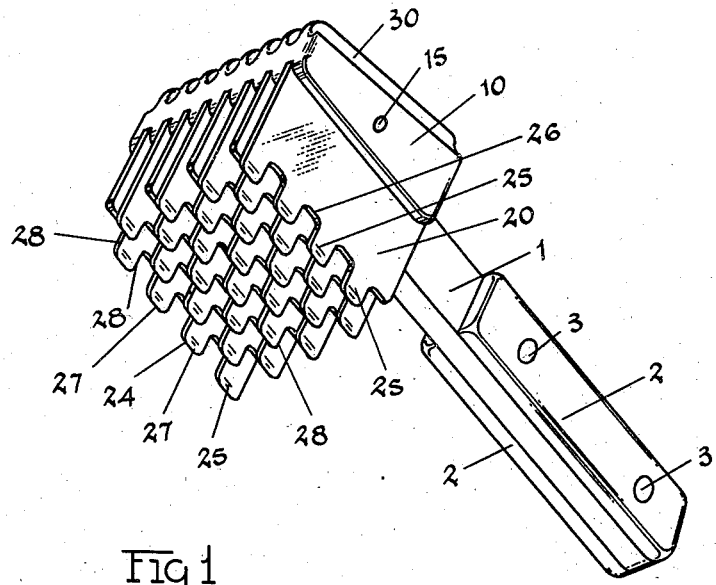
Fig 1
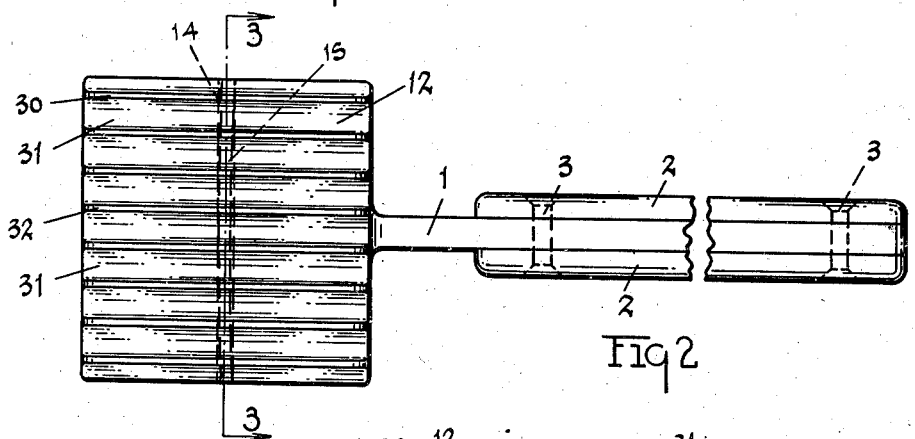
Fig 2
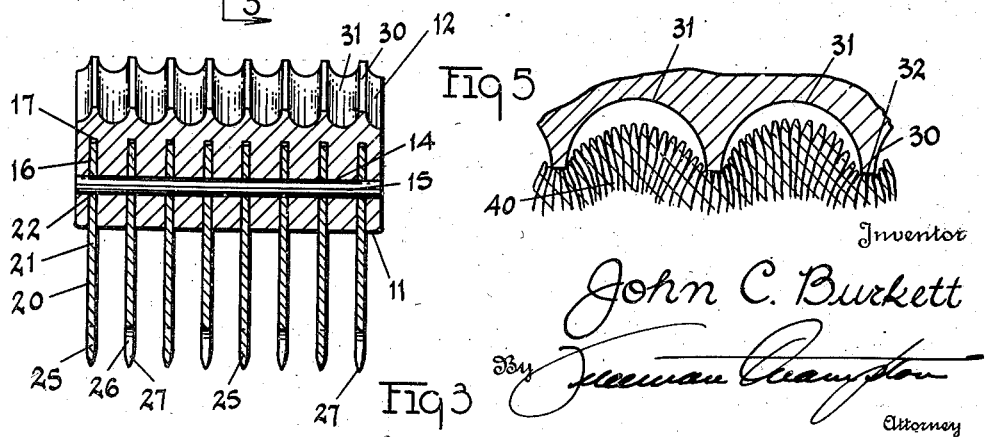
Fig 5
Fig 3
Inventor
John C. Burkett
By Freeman Crampton
Attorney July 27, 1948.　　　J. C. BURKETT　　　2,445,872
MALLET FOR PREPARING MEAT
Filed Dec. 3, 1945　　　2 Sheets-Sheet 2

Inventor
John C. Burkett
By Freeman Crampton
Attorney

Patented July 27, 1948

2,445,872

UNITED STATES PATENT OFFICE 2,445,872

MALLET FOR PREPARING MEAT

John C. Burkett, Toledo, Ohio

Application December 3, 1945, Serial No. 632,308

1 Claim. (Cl. 17—30)

My invention relates to utensils and particularly to a manually swingable mallet for preparing and tenderizing meat, preliminary to cooking. It is well known that by superficial or surface severance of the exposed tissue of meat, preliminary to cooking, the meat, which otherwise would be tough and difficult to masticate, is made tender and edible. Also it is well known that in preparing meat for cooking it is desirable to impregnate the surface with a flour or flavoring extracts or powders.

The utensil provided by my invention has on one face means on which exposed tough tissue of the meat may be surface severed and on its opposed face means by which pulverulent flour or flavoring materials may be forced into the exposed surface of the meat. The utensil not only has the advantage of serving the mentioned dual purposes, but also is so simply constructed and arranged that it may be easily assembled, at low cost, and quickly and thoroughly cleaned to the benefit of the user.

The invention has for a particular object to provide a mallet for preparing meat in which the handle and head parts are integral and in which the tissue severing elements are easily and quickly removable for sharpening, cleaning or replacement.

The invention consists in other features and advantages which will appear from the following description and upon examination of the accompanying drawings. Structures containing the invention may partake of different forms and still embody the invention. To illustrate a practical application of the invention, I have selected a mallet for preparing meat as an example of the various structures and details thereof that contain the invention, and shall describe the selected structure hereinafter, it being understood that variations may be made without departing from the spirit of the invention. The particular structure selected is shown in the accompanying drawings and described hereinafter.

Fig. 1 of the accompanying drawings illustrates a perspective view of a mallet for preparing meat embodying the features of my invention. Fig. 2 illustrates a plan view of the utensil shown in Fig. 1. Fig. 3 illustrates a view of a section taken along the plane of the line 3—3, indicated in Fig. 2. Fig. 4 illustrates a side elevational view of the utensil shown in Fig. 1. Fig. 5 illustrates somewhat diagrammatically the operation of one face surface of the mallet shown in Fig. 1, upon impacting engagement thereof with the surface of meat.

In the embodiment of my invention shown in Fig. 1 and related views of the drawing, there is provided a handle part 1 and a head part 10 which are integral with each other. The handle part 1 and head part 10 may be cast in a common mold to a considerable savings in cost. Also by such provision, the utensil user is assured against suffering the nuisance involved in separation of the head and handle parts. If desired, as shown in the drawings, the handle part may be provided with gripping elements, such as the wooden blocks 2, connected to the handle part and to each other by rivets 3.

The head part 10 is of some mass and ponderosity, so that when the mallet is swung by means of the handle, from a substantially upraised position to engagement with the meat being prepared, a blow of considerable force is delivered without noticeable effort by the user. One face surface 11 of the head part 10 extends in a plane substantially parallel to the major longitudinal axis of the handle part 1. The other and opposed face surface 12 of the head part extends in a plane which describes a substantially oblique angle with respect to said axis of the handle part.

To make provision for removably mounting the tissue severing blades hereinafter described, the head part is bored along a line extending parallel to the plane of the surface 11 and at right angle to the said major axis of the handle part 1 from one side of the head to the other. The hole 14 thus formed is of sufficient diameter and length to receive a pin 15, hereinafter described.

The head part is slotted to provide a plurality of slotted recesses 16. Each slotted recess extends inwardly of the head from the surface 11 in a direction at right angles to the plane of said face surface. Each slotted recess is parallel to the other like recess and to the said major axis of the handle part 1 and extends across the face surface 11, from edge to edge thereof. The depth of each slotted recess 16 is determined by the bottom surface 17 which, when viewed in side elevation, as in Fig. 4 of the accompanying drawings, is arcuate in contour. Thus, in machining the head, a plurality of slotting disc cutters may be arranged in spaced parallelism on a common arbor and by merely moving the head part material relative to a tool guide, the plurality of slotted recesses 16 may be cut in the head part by a single operation.

The slotted recesses 16 are adapted to receive and sustain a plurality of blade elements 20. Each blade element has a web portion 21 in which an opening 22 is provided. The opening 22 is of the same diameter as the diameter of the hole 14 in the head part. The edge 23 of each blade element 20, when viewed in side elevation, is arcuate and approximates the contour of the curvature of the bottoms 17 of the recesses 16. Each blade element is of a thickness slightly less than the width of a recess, and of a dimension, in one direction, equal to the length of a recess and of a dimension, in a direction at right angles, greater than the depth of a recess.

When the several blade elements are each installed in separate recesses, the openings 22 will be concentrically aligned with each other and the hole 14. The pin 15, thence inserted in the hole 14, will pass through the several openings to lock the blade elements in position relative to the head part. Preferably, the pin 15 is formed from resilient material and bent along its major longitudinal axis, before insertion. Hence, the axial alignment of the blade element openings and the walls of the hole 14 cause the pin to be distorted as it is inserted. The yielding resistance to distortion exerted by the pin increases the frictional surface engagement between the pin and the hole wall and opening surfaces, locking the pin in position for easy subsequent purposeful removal. On removal of the pin 15, the blade elements may be disengaged from the head to be sharpened, cleaned or replaced, as desired.

Each blade element 20 has an edge 24, opposite to the arcuate edge 23, and provided with a plurality of castellar teeth 25, in spaced and alternating arrangement with a plurality of gullies 26. Each tooth 25 has a sharpened crown 27 which extends lineally in parallel relation to the major axis of the handle part. Each tooth has vertical edges 28 which extend substantially at right angles to and from the crown 27 to the base or root of the tooth to join with the neighboring gully 26. Each gully extends lineally in parallel relation to the crown 27 of its neighboring tooth for a distance equal to the lineal extension of said crown. Hence, each tooth and gully are components in shape so that their blanking from stock will produce an edge on the cut-off which corresponds in shape to the edge 24. Thus, in production, a pair of blade elements having teeth 25 and gullies 26 may be struck in one operation, at a considerable savings in operational and material costs.

Each blade element 20 is installed in the slotted recesses as above described and, preferably, so that the teeth 25 of neighboring blade elements are in staggered relation on a plane extending parallel to the surface 11, as shown in Fig. 1 of the accompanying drawings. The user, by laying the meat to be prepared on a suitable block, may swing the mallet to cause the teeth 25 to engage the meat surface and sever the exposed tissue thereof, with but a negligible effort.

The opposed face surface 12 of the mallet head part is provided with means for impregnating the meat surface with pulverulent flour or flavoring compounds. Principally, such means comprises a plurality of spaced ribs 30. Each rib 30 extends parallel to the other like ribs and to the major axis of the handle part 1.

Between each spaced pair of ribs, a gully 31 is provided. Each gully is semi-cylindrical in cross-sectional contour and hence may be easily cleaned with an ordinary wiping cloth. The gullies form, with their neighboring ribs, a plurality of groove chambers in which, on impact of the meat being prepared, an impregnating air pressure may be generated to force infiltration of the flour or flavoring compound with respect to the meat surface.

Preferably, each rib has a flattened crown 32. Hence, when the mallet is swung to bring the face surface 12 and its ribs 30 into engagement with the meat surface 40, as shown in Fig. 5 of the accompanying drawings, the crown will not sever the meat, but will substantially pneumatically seal the chambers formed by engagement of the ribs and meat surface. The inclination of surface 12 to the major axis of the handle part 1, enables the user to assuredly impact the meat surface with full engagement of the ribs, and secure the aforesaid beneficial results.

While I have illustrated and described the best form of my invention now known to me, as required by the statutes, those skilled in the art will readily understand that changes may be made in the disclosed construction without departing from the spirit of my invention as set forth in the appended claim.

I claim:

A mallet for preparing meat and having integral handle and head parts; the head part having opposed face surfaces, the plane of one of which extends parallel to the major axis of the handle and the other extends at an oblique angle to said axis; the head part having a hole extending parallel to said planes of said face surfaces and at right angles to said major axis of the handle part; the head having a plurality of parallel slotted recesses extending inwardly of the head from the first named face surface at right angles to said planes of said face surfaces and terminating at contiguous points on an arcuate surface; a plurality of blade elements, each having a thickness slightly less than the width of the slotted recesses, a dimension in one direction greater than the depth of said slotted recesses and another dimension, at right angles to the first, equal to that of the length of the slotted recesses; each blade element having an opening in the web portion thereof equal in diameter to the diameter of the said hole and having an arcuate edge approximating the said arcuate surface of termination of the recesses and an opposed edge having a plurality of sharpened castellar teeth and alternate gullies, each gully of a shape and dimension substantially like that of a neighboring tooth; each blade element disposed in one of said recesses to locate the web opening thereof in registering relation with the said head hole and with the corresponding openings of all the similarly disposed blade elements; a pin initially having a bend along the line of its major axis and resilient to distortion and extending through the hole and openings of the assembled head and blade elements to retain the elements with their toothed edges extending beyond the head to points on a common plane extending parallel to the first named face surface of the head; and the said obliquely extending face surface having a plurality of alternately arranged flat crowned ribs and semi-cylindrical gully surfaces extending parallel to each other and to said major axis of the handle part.

JOHN C. BURKETT.

REFERENCES CITED

The following references are of record in the file of this patent:

UNITED STATES PATENTS

| Number | Name | Date |
|---|---|---|
| 421,855 | Burk | Feb. 18, 1890 |
| 576,281 | Schofield | Feb. 2, 1897 |
| 633,740 | Stanley | Sept. 26, 1899 |
| 1,161,845 | Chatillon | Nov. 30, 1915 |

FOREIGN PATENTS

| Number | Country | Date |
|---|---|---|
| 336,307 | France | Jan. 11, 1904 |